(12) United States Patent
Sasaki (10) Patent No.: US 10,006,402 B2
(45) Date of Patent: Jun. 26, 2018

(54) PISTON FOR INTERNAL COMBUSTION ENGINE AND METHOD FOR MANUFACTURING PISTON

(71) Applicant: Hitachi Automotive Systems, Ltd., Hitachinaka-shi, Ibaraki (JP)

(72) Inventor: Masato Sasaki, Sagamihara (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 78 days.

(21) Appl. No.: 14/417,262

(22) PCT Filed: Jul. 25, 2013

(86) PCT No.: PCT/JP2013/070175
§ 371 (c)(1),
(2) Date: Jan. 26, 2015

(87) PCT Pub. No.: WO2014/017586
PCT Pub. Date: Jan. 30, 2014

(65) Prior Publication Data
US 2015/0204268 A1    Jul. 23, 2015

(30) Foreign Application Priority Data
Jul. 27, 2012 (JP) .................. 2012-166456

(51) Int. Cl.
*C04B 41/81* (2006.01)
*F02F 3/02* (2006.01)
(Continued)

(52) U.S. Cl.
CPC ............... *F02F 3/02* (2013.01); *B22C 9/103* (2013.01); *B22C 9/108* (2013.01);
(Continued)

(58) Field of Classification Search
CPC ........ F05C 2201/021; F05C 2201/0448; F02F 3/22; F02F 3/00; F02B 3/06;
(Continued)

(56) References Cited

U.S. PATENT DOCUMENTS 4,008,023 A * 2/1977 Wentzell ............... B22F 3/1291
249/61
4,904,291 A * 2/1990 Siebers ............... B01J 37/0018
264/125

(Continued)

FOREIGN PATENT DOCUMENTS

CN    20776886 U  *  3/2011
JP    60-240364 A    11/1985
(Continued)

OTHER PUBLICATIONS

International Search Report (PCT/ISA/210) dated Sep. 10, 2013 with English translation (eight pages).

*Primary Examiner* — Jacob Amick
*Assistant Examiner* — Charles Brauch
(74) *Attorney, Agent, or Firm* — Crowell & Moring LLP (57) ABSTRACT

An internal combustion engine piston includes a crown surface including a low thermal conductivity part lower in thermal conductivity than a base material. The low thermal conductivity part includes a porous member made of a glass material lower in thermal conductivity than the base material, and impregnated with the base material. A first material is interposed at least partly between the porous member and the base material in the low thermal conductivity part, wherein the first material is water-soluble, and has a higher melting point than the porous member.

18 Claims, 5 Drawing Sheets

B PART (51) Int. Cl.
*B22D 25/02* (2006.01)
*B22D 31/00* (2006.01)
*B22D 19/00* (2006.01)
*B22D 27/15* (2006.01)
*B22C 9/10* (2006.01)
*F02F 3/22* (2006.01)
*F02F 3/00* (2006.01)
*F02B 3/06* (2006.01)
*C04B 41/85* (2006.01)

(52) U.S. Cl.
CPC ......... *B22D 19/0027* (2013.01); *B22D 25/02* (2013.01); *B22D 27/15* (2013.01); *B22D 31/00* (2013.01); *F02F 3/0084* (2013.01); *C04B 41/81* (2013.01); *C04B 41/85* (2013.01); *F02B 3/06* (2013.01); *F02F 3/00* (2013.01); *F02F 3/22* (2013.01); *F05C 2201/021* (2013.01); *F05C 2201/0448* (2013.01); *F05C 2251/048* (2013.01)

(58) Field of Classification Search
CPC ..... C04B 2235/00; C04B 41/81; C04B 41/85; C04B 2237/00
USPC ........................................ 123/193.6
See application file for complete search history.

(56) References Cited

U.S. PATENT DOCUMENTS

| | | | | |
|---|---|---|---|---|
| 5,122,226 A | * | 6/1992 | Minford | ................. B29C 70/86 216/34 |
| 5,366,015 A | * | 11/1994 | Surjaatmadja | .......... B24C 1/003 166/298 |
| 2003/0129437 A1 | * | 7/2003 | Kawaguchi | ............... B32B 5/02 428/545 |
| 2004/0112173 A1 | * | 6/2004 | Maulik | ............... C22C 33/0278 75/246 |
| 2005/0283976 A1 | * | 12/2005 | Otaka | .................... B21K 1/185 29/888.04 |
| 2009/0206525 A1 | * | 8/2009 | Sato | ....................... B01J 20/103 264/610 |
| 2009/0266331 A1 | * | 10/2009 | Ando | ....................... C21D 7/06 123/193.6 |
| 2010/0243457 A1 | * | 9/2010 | Fujita | ..................... C25D 11/04 205/50 |

FOREIGN PATENT DOCUMENTS

| | | |
|---|---|---|
| JP | 62-45964 A | 2/1987 |
| JP | 1-108179 A | 4/1989 |
| JP | 11-193721 A | 7/1999 |
| JP | 2008-267158 A | 11/2008 |
| JP | 2012-72747 A | 4/2012 |

* cited by examiner

B PART

PISTON FOR INTERNAL COMBUSTION ENGINE AND METHOD FOR MANUFACTURING PISTON

TECHNICAL FIELD

The present invention relates to an internal combustion engine piston formed by casting, and a production process for the internal combustion engine piston.

BACKGROUND ART

As is well known, as a spark-ignition gasoline internal combustion engine, a so-called direct-injection (GDI) internal combustion engine is provided, which is aimed to improve fuel economy by lean burn and enhance output power by homogeneous combustion.

In such an engine, it is known that provision of a thermal insulating material partly in a crown surface of a piston made of aluminum alloy, wherein the crown surface forms a combustion chamber, produces an effect to promote atomization of injected fuel. However, it is difficult to tightly bind the thermal insulating material to the aluminum alloy base material.

Therefore, as described in a patent document 1 below, it is proposed to impregnate a porous thermal insulating material with an aluminum alloy base material, wherein the thermal insulating material is lower in thermal conductivity than the aluminum alloy base material, and thereby tightly bind the thermal insulating material to the aluminum alloy base material.

PRIOR ART DOCUMENT(S)

Patent Document(s)

Patent Document 1: Japanese Patent Application Publication No. H11-193721

SUMMARY OF THE INVENTION

Problem(s) to be Solved by the Invention

However, according to the conventional technique described in the patent document 1, an air layer or vacuum layer is formed between the porous thermal insulating material and the base material, in consideration that no sufficient thermal insulation effect can be obtained if the base material is impregnated into the entire pores of the porous insulating material. The prioritization to the thermal insulation effect leads again to the technical problem that sufficient binding strength between the base material and the porous insulating material cannot be obtained.

It is an object of the present invention to provide an internal combustion engine piston and a production process for the internal combustion engine piston, which can simultaneously achieve high thermal insulation and high binding strength between the piston base material and the low thermal conductivity part.

Means to Solve the Problem(s)

According to one aspect of the present invention, an internal combustion engine piston for an in-cylinder injection spark-ignition internal combustion engine, comprises: a crown surface; and a low thermal conductivity part provided partly in the crown surface, and disposed at a predetermined portion of the crown surface, wherein the predetermined portion is configured to receive injection of fuel from an injector, and wherein the low thermal conductivity part is lower in thermal conductivity than a base material of the internal combustion engine piston; wherein: the low thermal conductivity part includes a porous member made of a glass material lower in thermal conductivity than the base material, and impregnated with the base material; and a first material is interposed at least partly between the porous member and the base material in the low thermal conductivity part, wherein the first material contains at least one of sodium chloride, potassium chloride, magnesium chloride, calcium chloride, potassium carbonate, sodium carbonate, sodium sulfate, magnesium sulfate, potassium sulfate, sodium nitrate, potassium nitrate, magnesium nitrate, calcium nitrate, and sodium tetraborate.

Effect(s) of the Invention

According to the present invention, it is possible to simultaneously achieve high thermal insulation and high binding strength between the piston base material and the low thermal conductivity part.

BRIEF DESCRIPTION OF THE DRAWINGS

FIG. 3 shows a casting mold device employed in the present embodiment, wherein

MODE(S) FOR CARRYING OUT THE INVENTION

The following describes in detail an internal combustion engine piston according to the present invention, and a production process for the internal combustion engine piston according to the present embodiment, with reference to the drawings. The piston employed in the present embodiment is applied to a spark-ignition direct-injection gasoline engine.

Figure 1A:
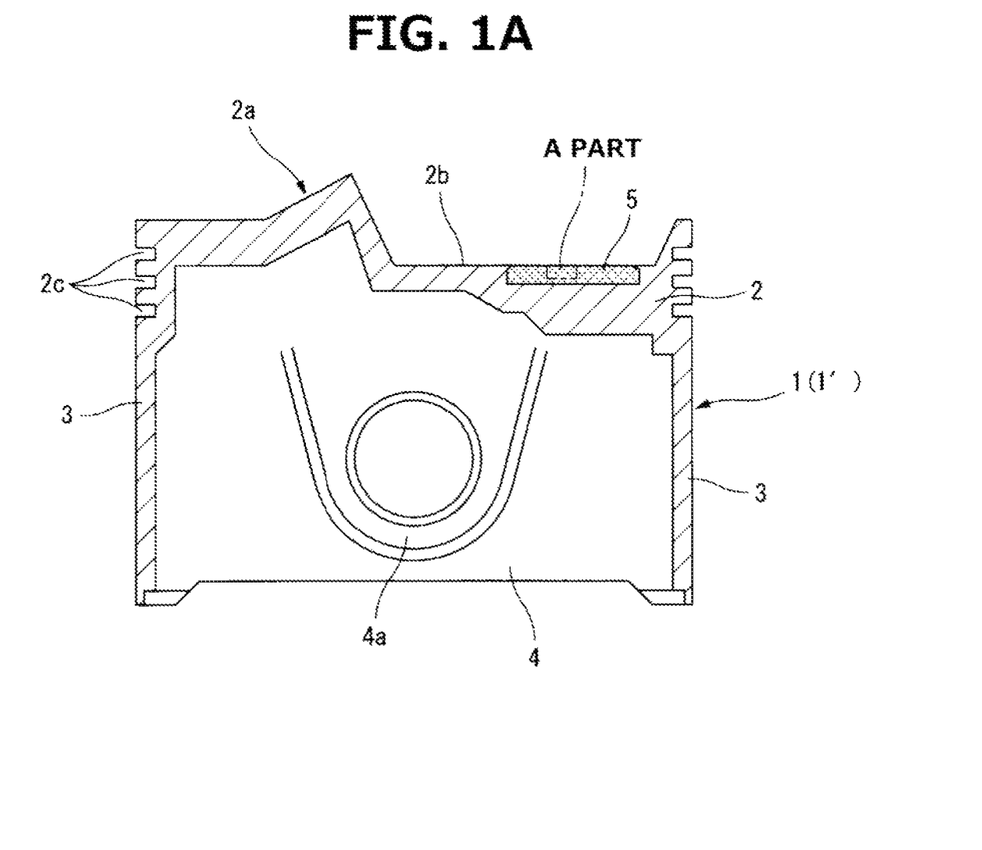
FIG. 1A is a longitudinal sectional view of an internal combustion engine piston according to the present invention.

The whole of the piston 1 is integrally cast of an AC8A Al—Si based aluminum alloy as a base material. As shown in FIG. 1, the piston 1 includes: a crown part 2 formed into a substantially cylindrical shape, and defining a combustion chamber on a crown surface 2a; a thrust-side skirt part 3 and an anti-thrust-side skirt part 3 in a pair, each of which is formed integrally with an outer peripheral edge of a lower end of the crown part 2, and has a circular arc shape; and a pair of apron parts 4 coupled to both ends of each skirt part 3 in its circumferential direction via respective connecting portions. The apron parts 4 are formed integrally with respective pin boss portions 4a, 4a for supporting both ends of a piston pin not shown.

The crown part 2 has a disc shape formed relatively thick. The crown surface 2a defining the combustion chamber is formed in a substantially uneven shape in sectional view, and is formed partly with a recessed portion 2b having a large flat surface area. A low thermal conductivity part 5 lower in thermal conductivity than the piston base material 1' is embedded in a predetermined location of an upper surface of the recessed portion 2b. Further, the outer periphery of the crown part 2 is formed with three piston ring grooves 2c.

Figure 1B:
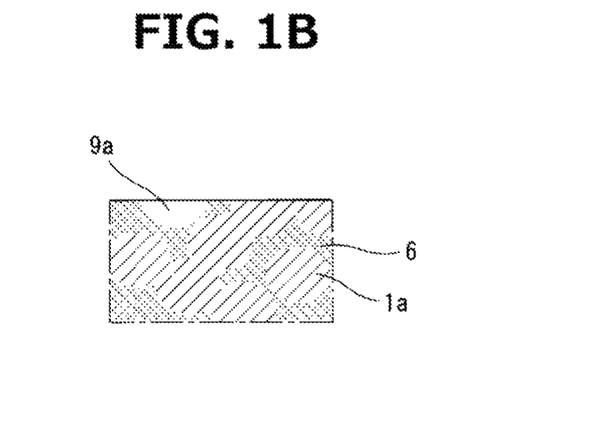
FIG. 1B is an enlarged view of an A-part shown in FIG. 1A.

The low thermal conductivity part 5 is embedded in the location of the recessed portion 2b receiving direct injection of fuel from an injector in the form of a fuel injection valve provided in a cylinder head not shown. The low thermal conductivity part 5 is embedded integrally in the recessed portion 2b during casting of the piston 1 described below. As shown in FIG. 1B, in the low thermal conductivity part 5, a part 1a of the piston base material 1' is impregnated into the inside of a porous member 6 which is made of a glass material having a lower thermal conductivity than the piston base material 1'.

Specifically, the low thermal conductivity part 5 is composed of: the porous member 6 made of the glass material and formed into a generally convex disc shape by a production process described below separately from the piston 1; and the aluminum alloy material 1a that is part of the base material 1' filled in pores 9a which are formed after a water-soluble salt pre-filled in the pores of the porous member 6 is dissolved.

<Production Process for Porous Member> The following describes the outline of the production process for the porous member 6. First, a first powder 8 and a second powder 9 are mixed together to produce a mixed powder, wherein the first powder 8 is a powder of glass insoluble in water, and the second powder is a soluble powder material (sodium chloride powder material). The mixed powder is placed into a mold, and pressure-formed at a predetermined pressure, and thereafter sintered at a temperature $T_B$. The sintering temperature $T_B$ of the first powder 8 is lower than the sintering temperature $T_A$ of the second powder 9.

Figure 2A:
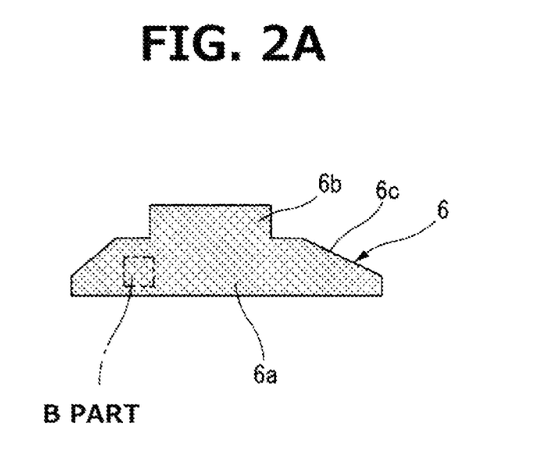
FIG. 2A is a longitudinal sectional view of a porous member employed in the present embodiment.
Figure 2B:
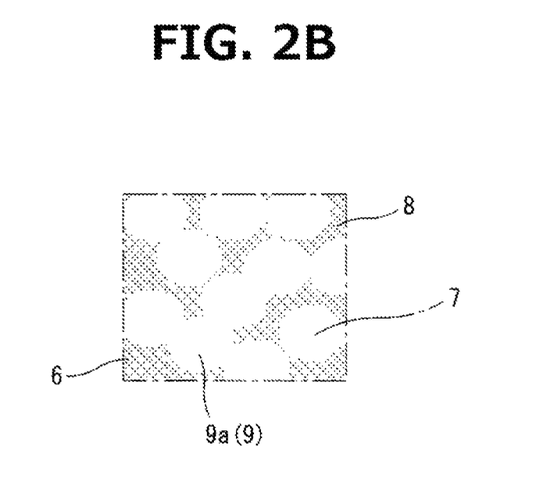
FIG. 2B is an enlarged view of a B-part shown in FIG. 2A.

Thereafter, the sintered product is immersed in water or hot water or water that has been stirred, so that the second powder 9 in the sintered product is dissolved away by the water or hot water, to form may pores 9a and thereby form the porous member 6 shown in FIG. 2. The thermal conductivity of the porous member 6 is sufficiently lower than that of the base material 1' that is a molten metal.

The first powder 8 is a glass powder as described above, and is a hard and transparent substance based on silicate, borate, phosphate which is a non-crystalline solid exhibiting a glass transition phenomenon with rising temperature. Chemically, the first powder 8 mainly contains a silicate compound (silicate mineral) which becomes glassy state. The oxide constituting the glass is $SiO_2$, $Al_2O_3$, $B_2O_3$, BaO, $Bi_2O_3$, $Li_2O$, MgO, $P_2O_5$, PbO, SnO, $TiO_2$, ZnO, $R_2O$ (R is an abbreviation of alkali metal: Li, Na, K), or RO (R is an abbreviation of alkaline-earth metal: Mg, Ca, Sr, Ba).

The temperature at which the first powder 8 is softened (softening point) is lower than the melting point of the second powder 9, wherein the first powder 8 has a melting point higher than or equal to 700° C.

The transition point, which is a temperature at which the glass structure changes, wherein the viscosity is about 1013.3 poise. The softening point, which is a temperature at which the glass is softened and deformed by its own weight, wherein the viscosity is about 107.6 poise.

On the other hand, the second powder 9 contains a water-soluble salt such as sodium chloride, potassium chloride, magnesium chloride, calcium chloride, calcium carbonate, sodium carbonate, sodium sulfate, magnesium sulfate, potassium sulfate, sodium nitrate, calcium nitrate, magnesium nitrate, potassium nitrate, or sodium tetraborate. The second powder 9 may be one of them or a mixed salt of two or more of them.

It is desirable that the salt is a water-soluble salt having a melting point exceeding 700° C., such as sodium chloride, potassium chloride, magnesium chloride, calcium chloride, calcium carbonate, sodium carbonate, sodium sulfate, magnesium sulfate, potassium sulfate, or sodium tetraborate. In the present embodiment, sodium chloride is employed.

Example

The following describes a specific production process for the porous member 6.

First, the first powder 8 is mixed with the second powder 9, wherein the first powder 8 is borosilicate glass (glass powder ASF1898, produced by Asahi Glass Co., Ltd.), and the second powder 9 is sodium chloride.

The mixing ratio of the first powder 8 and the second powder 9 was set so that the second powder 9 is 60 to 80 vol %, and the first powder is 40 to 20 vol %. The first powder 8 and the second powder 9 were mixed to produce a mixed powder, wherein the first powder 8 and the second powder 9 were in a weight ratio of 54:46 (mixing operation).

The particle size of each powder was set so that the first powder 8 had an average particle size of 4.5 µm, and the second powder 9 had an average particle size of 850 to 1300 µm.

Then, the mixed powder is set in a mold and pressure-formed, and burnt by heating at a temperature of 650 to 750° C. for a period of 20 to 40 minutes. In this example, the mixed powder was heated at a temperature of 700° C. for a period of 30 minutes, to obtain a sintered product (burning operation).

The sintered product was immersed in stirred hot water at 55° C. so that the inside second powder 9 (sodium chloride) was dissolved and extracted from the sintered product to obtain a porous member 6 having many pores 9a (dissolution operation). In the dissolution operation, the second powder 9 is subject to dissolution in hot water at 50 to 95° C. for a period of 5 minutes to 3 hours.

As shown in FIG. 2A, the porous member 6 includes a disk-shaped base portion 6a, and a projecting portion 6b, wherein the projecting portion 6b has a small-diameter cylindrical shape, and is formed integrally with the upper surface of the base portion 6a, and wherein the outer peripheral edge of the upper end of the base portion 6a is formed with a tapered surface 6c. Further, as shown in FIG. 2B, major part of the second powder 9 is dissolved and removed from the porous member 6, and the first powder 8 (glass) remains in the porous member 6, so that many pores 9a are formed around the first powder 8.

In the mixing operation and the burning operation described above, heating the molded body of the mixed powder of the first powder 8 (glass powder) and the second powder 9 (sodium chloride) causes the glass powder to surround and cover the particles of sodium chloride. Accordingly, the formed configuration of the porous member 6 varies depending on the mixing ratio of the first powder 8 and the second powder 9.

Figure 6:
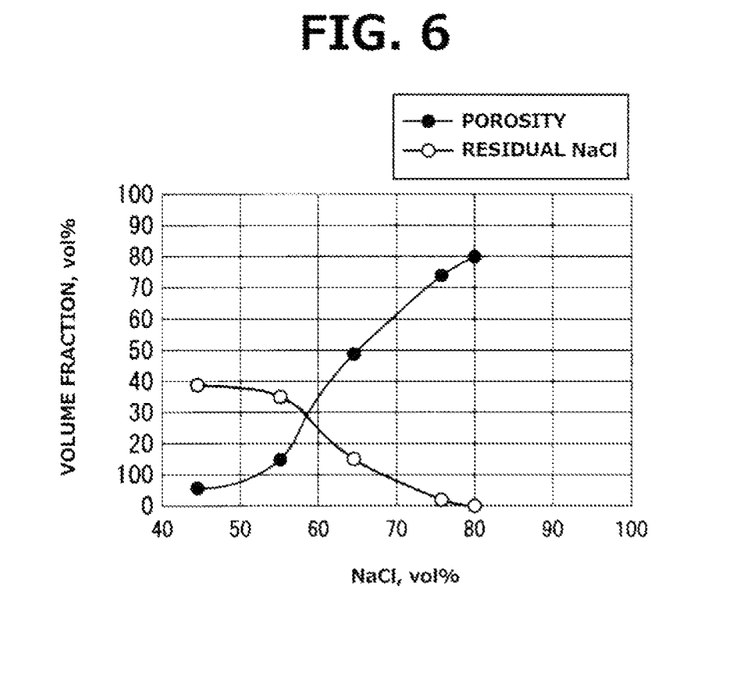
FIG. 6 is a characteristic diagram showing porosity and residual sodium chloride in relation to a volume ratio of sodium chloride in the porous member.
Figure 7:
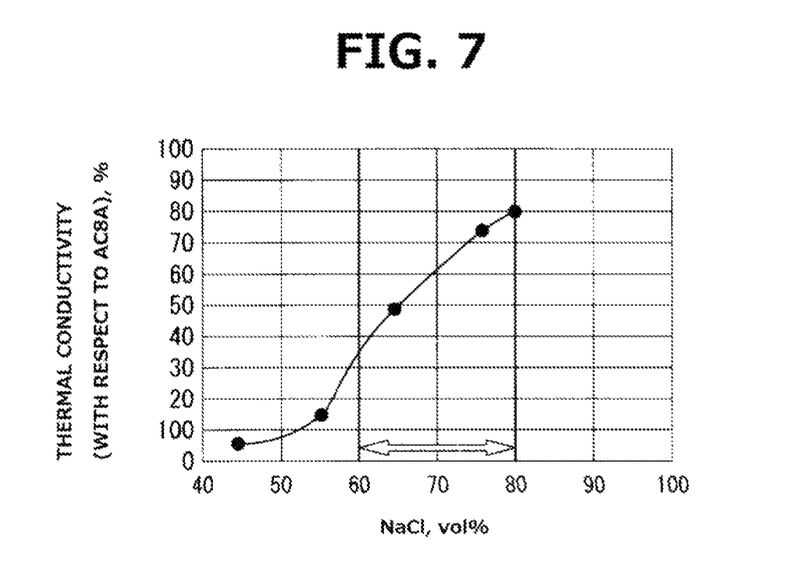
FIG. 7 is a characteristic diagram showing a relationship between volume of sodium chloride and thermal conductivity.

The inventor(s) of the present application made an experiment in which the mixing ratio of the first powder 8 and the second powder 9 was variously changed, and got a result shown in FIGS. 6 and 7.

Specifically, for example, when the powder of sodium chloride is at 80 vol % or more, and the glass powder is at 20 vol % or less, the glass powder particles are not melt to be bonded to each other to produce a formed body by heating, so that the form of the body is lost when dissolved in water or hot water.

When the powder of sodium chloride is less than 60 vol %, and the glass powder is more than 40 vol %, the glass powder particles are melted to be bonded to each other easily by heating, resulting in surrounding and covering the sodium chloride powder particles. Accordingly, when the powder of sodium chloride is dissolved out in water or hot water thereafter, the water or hot water cannot contact the sodium chloride powder, so that the porous member 6 cannot be formed.

When the powder of sodium chloride is at 60 to 80 vol %, and the glass powder is at 40 to 20 vol %, open pores 9a (pores communicating from the surface to the inside) are obtained. All of the sodium chloride powder is not dissolved, but part of the sodium chloride powder is brought into closed state by being covered with the glass powder. The quantity of sodium chloride powder in the closed state is determined by the mixing ratio of the sodium chloride powder (second powder 9) and the glass powder (first powder 8).

When the sodium chloride (second powder 9) is at 80 vol %, there is no residual sodium chloride after the dissolution. As the volume percent of the second powder 9 decreases, the volume percent of the residual sodium chloride increases. Then, when the second powder 9 is at 60 vol %, the residual sodium chloride powder is at 25 vol %. The residual sodium chloride powder is surrounded by the first powder 8 that is a glass powder, and functions as a thermal insulating material. On the other hand, when the porous material 6 thus obtained is impregnated with a piston cast alloy (aluminum alloy 1a) described below, and the impregnated part is finished by cutting, the residual sodium chloride appears in the cut surface.

When the appeared sodium chloride powder is dissolved and removed with water or hot water again, the cut surface becomes a composite structure of cast alloy of the piston base material 1' and the glass that is the porous member 6. As the quantity of the sodium chloride powder increases, the dissolved quantity increases, which increases the unevenness of the surface and thereby increases the area of the surface.

The residual sodium chloride increases as the volume ratio of the sodium chloride decreases.

In view of the foregoing, in this embodiment, the second powder 9 (sodium chloride powder) is set at 60 to 80 vol %, and the first powder 8 (glass powder) is set at 40 to 20 vol %.

Then, most of the second powder 9 is removed, and the porous member 6 composed mainly of the first powder 8 (glass) is placed in a vacuum casting mold 10 for molding the piston 1, and part of the base material 1' is impregnated into the pores of the porous member 6 during molding of the piston 1, to embed the low thermal conductivity part 5 integrally in the recessed portion 2b of the crown surface 2a.

<Structure of Piston Casting Mold>

Figure 3A:
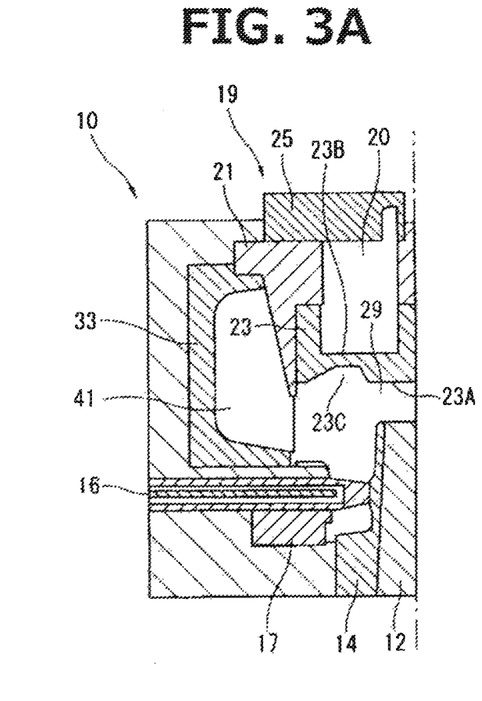
FIG. 3A is a longitudinal sectional view of the casting mold device.
Figure 3B:
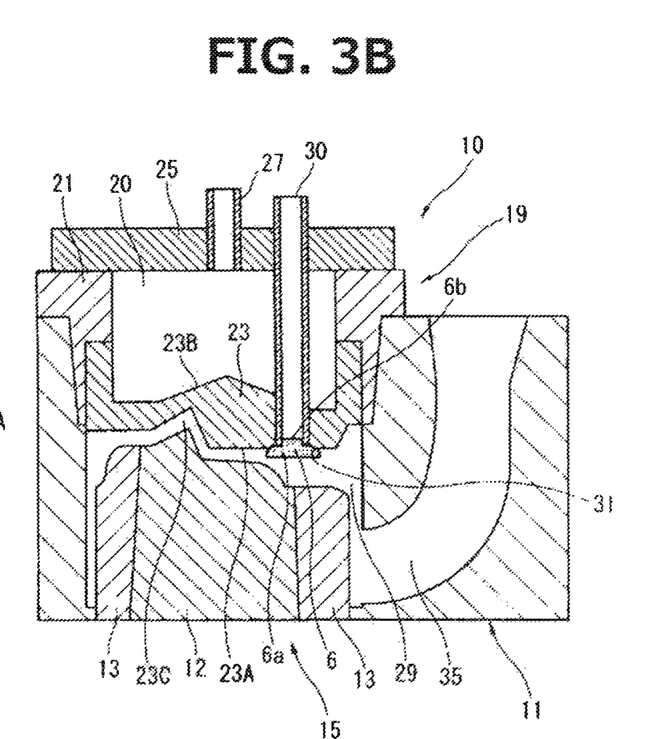
FIG. 3B is a longitudinal sectional view showing the casting mold device partly.

As shown FIGS. 3A and 3B, the vacuum casting mold 10 includes a mold 11, and a core 15 in a lower part of the mold 11, wherein the core 15 is formed as a combination of a plurality of split cores, such as a center core 12, and a Philip core 13 and a side core 14 arranged around the center core 12. The core 15 is to form the inner shape of the piston 1 when molding the piston 1.

The vacuum casting mold 10 is provided with left and right wrist pins 16 extending horizontally and facing each other for forming a cooling passage for circulating cooling water therein. The distal end of the wrist pin 16 is detachably engaged with a hole formed in the side core 14.

The vacuum casting mold 10 further includes a mold bush 17 for supporting the wrist pin 16, and a top core 19 in the upper part, which is removable from the mold 11.

The top core 19 includes an outer top core 21 and an inner top core 23, wherein the outer top core 21 has a space as an example of a vacuum vent section 20, and the inner top core 23 is provided integrally with the outer top core 21.

The outer top core 21 is provided with an adapter 25 in the upper end part for sealing the vacuum vent section 20, and is provided with a first communication pipe 27 substantially in the center of the adapter 25. The first communication pipe 27 communicates with the vacuum vent section 20, and is connected to a negative pressure generator such as a vacuum pump not shown. Accordingly, the inside of the vacuum vent section 20 can be depressurized to a negative pressure by operation of the negative pressure generator.

The vacuum vent section 20 is in the form of a space, which may be a chamber-shaped space, a hole-shaped space, or groove-shaped space. In short, the vacuum vent section 20 may have a configuration exhibiting a function to suck and vent efficiently gas in a cavity described below via the inner top core 23 (by passing through the inner top core 23).

The inner top core 23 is arranged to face the core 15, and form a cavity 29 between the core 15 and the mold 11. The inner top core 23 is formed as an air-permeable mold (porous mold) made of a porous material obtained by sintering an iron-based metal powder such as an SUS material.

Specifically, the inner top core 23 is formed of an iron-based metal powder having a particle size greater than or equal to 100 mesh and less or equal to 250 mesh, by a hot isostatic pressing (HIP), into a breathable mold material having a pore size of 4 to 12 μm, and is thereafter sintered, or sintered simultaneously with the forming. The inner top core 23 is thus formed as a breathable mold.

The lower surface of the inner top core 23 is a cavity surface 23A that faces the core 15, and is formed as a transfer surface for transferring the crown surface 2a of the piston 1 when molding the piston 1 as a product by pouring a molten aluminum alloy into the cavity 29. The cavity surface 23A is formed as a finished surface by electrical discharge machining. Namely, the cavity surface 23A is formed as a finished surface having already a surface roughness conforming to a surface roughness level of the final product, so that no post-processing such as a finishing process and a buffing process is required, wherein the setting of electrical discharge machining is set in a finishing region employed by a die sinking electrical discharge machining device.

Accordingly, the inner top core 23 is excellent in heat resistance and wear resistance to a molten aluminum alloy, and no galling occurs. Specifically, since the cavity surface 23A of the inner top core 23 is processed as a product-level finished surface by electric discharge machining without cutting and polishing, there is no possibility that the metal powder particles are crushed to block the pores between the particles, and the air permeability of the pores between the powder particles is maintained satisfactorily.

Moreover, in the cavity surface 23A of the inner top core 23, a part 23B is formed to have a thickness greater than 2 mm and less or equal to 12 mm, wherein the part 23B corresponds to a delicate portion and an edge portion of a crown combustion chamber of the crown surface 2a of the piston 1 as a product.

Figure 4:
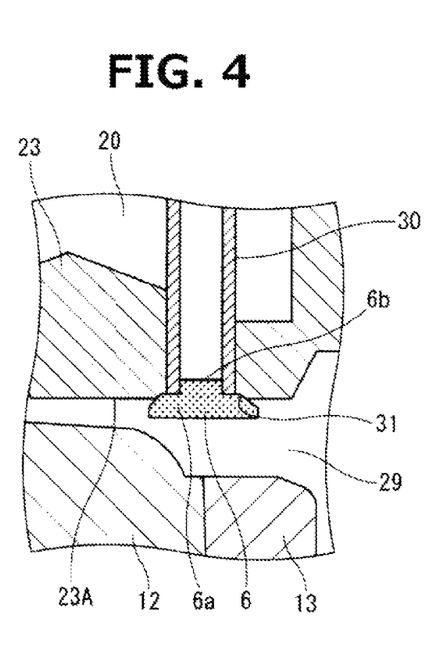
FIG. 4 is an enlarged sectional view showing a state where the porous member is set in the casting mold device.
Figure 5:
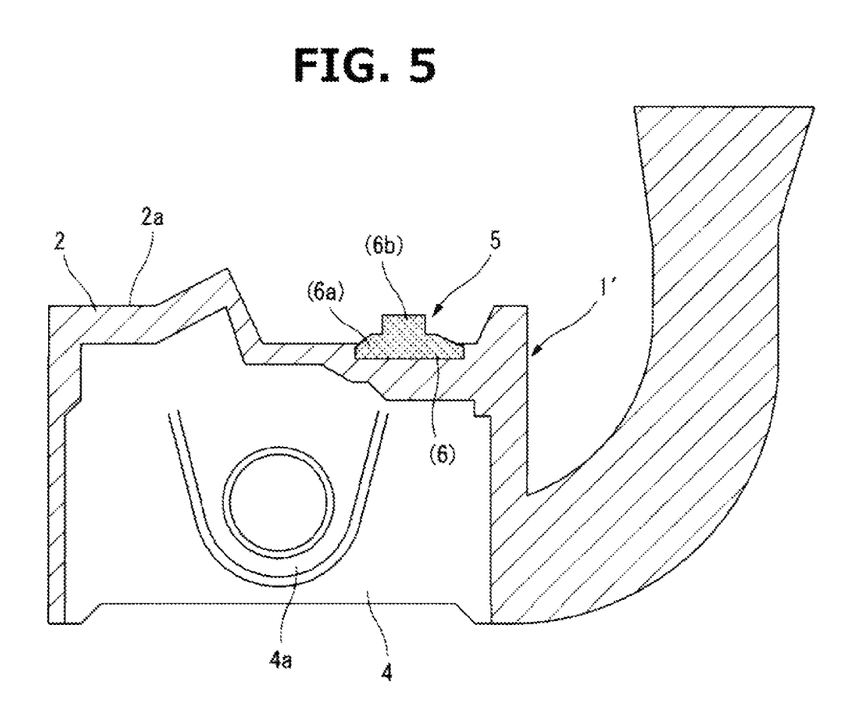
FIG. 5 is a longitudinal sectional view showing a piston shaped body immediately after being cast by the casting mold device.

As shown in FIGS. 3 and 4, the portion of the inner top core 23 corresponding to the portion of the crown surface 2a where the recessed portion 2b is formed, is provided with a second communication pipe 30 which is a metal pipe, and extends in the vertical direction through the inner top core 23, the vacuum vent section 20, and the adapter 25. The lower end portion of the second communication pipe 30 is formed with a retaining recess 31 having a conical shape for retaining the porous member 6. Namely, the porous member 6 is retained in the predetermined location in the cavity surface 23A of the inner top core 23 in advance, and the projecting portion 6b is fitted and retained by press-fitting in the lower end portion of the second communication pipe 30, and the base portion 6a is retained in contact with the peripheral surface of the retaining recess 31.

The upper end portion of the second communication pipe 30 is connected to a negative pressure generator such as a vacuum pump not shown, similar to the first communication pipe 27. Accordingly, by operation of the negative pressure generator, the inside of the porous member 6 retained in the retaining recess 31 is depressurized to a negative pressure, so that molten aluminum is impregnated into the many pores 9a as described below.

As described above, the inner top core 23 is formed in a porous form. Accordingly, when the vacuum vent section 20 is brought into negative pressure state, gas in the cavity 29 is sucked and vented through the inner top core 23 to the vacuum vent section 20 and then to the outside. The molten aluminum alloy poured into the cavity 29 is sucked into direct contact with the cavity surface 23A (transfer surface) of the inner top core 23, so that the shape of the cavity surface 23A is transferred.

When the shape of the cavity surface 23A of the inner top core 23 is transferred to the product by direct contact between the molten material and the cavity surface 23A, it is difficult in general to transfer the shape precisely due to the surface tension of the molten material if the product includes a delicate portion or an edge portion. Accordingly, in the present embodiment, the thickness of the part 23B of the top core 23 corresponding to the delicate portion or edge portion is set thinner than that of the remaining part of the inner top core 23.

Accordingly, when the vacuum vent section 20 is brought into negative pressure state to suck and vent gas in the cavity 29, and the molten material in the cavity 29 is sucked into direct contact with the cavity surface 23A of the inner top core 23, it is possible to effectively carry out the suction of the part corresponding to the delicate portion or edge portion of the product, and thereby transfer the shape of the cavity surface 23A of the inner top core 23 accurately, even if the product includes the delicate portion or edge portion.

The tolerable roughness of the finished crown surface 2a of the piston 1 employed by the gasoline direct injection type in which a tumble flow or swirl flow is caused by direct injection of fuel into the combustion chamber formed in the crown surface 2a of the piston 1, depends on the position of an injection nozzle and others, but is generally Ra=8 µm or smaller, and the minimum draft angle of the crown surface portion of the mold is 5 degrees. Accordingly, the porous material of the inner top core 23 is implemented by a stainless steel powder of 100 mesh (particle size of 20 µm), and a porous mold material having a pore size of 4 µm is formed by the HIP molding process. Then, the porous mold material is sintered, and the cavity surface 23A is applied with a finishing process of electric discharge machining to a surface roughness of Ra=8 µm or smaller.

In addition, the part 23B of the inner top core 23 corresponding to the recessed portion 23C formed in the cavity surface 23A, wherein the recessed portion 23C corresponds to the projecting portion of the crown surface 2a, is a part where the shape of the crown surface 2a is hard to appear, and is therefore set to a wall thickness of 8 mm. It is desirable that the reduction of wall thickness is directed only to the part required to be accurate in consideration of the strength and the mold temperature.

In the mold 11, the cavity 29 is in fluid communication with a riser cavity 41 to compensate for volume shrinkage of the molten material when the molten material poured into the cavity 29 is cooled and solidified. Around the riser cavity 41, a riser insert 33 is provided which is formed of a material high in heat retaining property. The mold 11 is further formed with a runner 35 for pouring the molten material into the cavity 29, wherein the runner 35 is communicated with the lower portion of the cavity 29.

<Casting Process of Piston> Accordingly, for casting of the piston 1 with the mold 10, the molten aluminum alloy is poured into the cavity 29 through the runner 35 of the mold 11, and the vacuum vent section 20 is subject to a negative pressure. The supply of the molten material into the cavity 29 is performed at the lower side of the cavity 29, and the vacuum vent section 20 is depressurized to negative pressure, so that the gas in the cavity 29 passes through the inner top core 23, and is vented to the outside. Accordingly, it is possible to effectively vent the gas from the cavity 29.

Simultaneously, the porous member 6 is depressurized to negative pressure through the second communication pipe 30 by the vacuum pump.

Accordingly, the molten material supplied to the cavity 29 is sucked into direct and intimate contact with the cavity surface 23A (transfer surface) of the inner top core 23, because the vacuum vent section 20 is at negative pressure. In this situation, the configuration that the thickness of the part 23B of the inner top core 23 corresponding to the portion of the product including a delicate portion or edge portion, is set thinner than the remaining part, makes it possible to effectively perform the sucking and the intimate contact of the molten material at this part and transfer the shape more accurately.

Specifically, when the molten aluminum alloy is poured into the cavity 29 through the runner 35, and the sprue is closed by the molten aluminum alloy, a motor for depressurization (not shown) is driven to vent air from the vacuum vent section 20, and thereby depressurize the vacuum vent section 20. When this depressurization causes a differential pressure between the vacuum vent section 20 and the cavity 29, the gas in the cavity 29 is vented through the pores of the breathable mold (porous mold) 23 to the outside.

When the molten material in the cavity 29 rises gradually to be into contact with the cavity surface 23A of the inner top core 23, the molten material is sucked into intimate contact with the cavity surface 23A because the vacuum vent section 20 is depressurized. When the piston 1 is formed, the unevenness of the cavity surface 23A is transferred to the piston crown surface. The configuration that the part 23B of the recessed portion 23C of the cavity surface 23A, which corresponds to the projecting part of the piston crown surface, is formed thinner than the remaining part, makes it possible to effectively perform the suction and intimate contact of the molten material at this part, and precisely form a part of the crown surface 2a even if the shape of the part of the crown surface 2a is hard to appear.

Since the inside of the porous member 6 is at negative pressure, part of the molten aluminum in the cavity 29 is sucked into the porous member 6, and is made to permeate and fill the many pores 9a from which sodium chloride has been dissolved. As a result, as shown in FIG. 7, the low thermal conductivity part 5 impregnated with the aluminum alloy material 1a that is the piston base material 1' is embedded integrally in and fixed to the piston base material 1'. The pores 9a are filled with the aluminum alloy material 1a, wherein a small quantity of the second powder 9 (sodium chloride) remains.

Thereafter, the piston base material 1', which is integrated with the low thermal conductivity part 5, is taken out from the cooled vacuum casting mold 10, and as shown in FIG. 1A, a cutting process is applied to burrs formed in the outer peripheral surface of the piston base material 1', and performed to form the piston ring grooves 2c, and applied to the upper surface of the base portion 6a and the projecting portion 6b of the low thermal conductivity part 5 (porous member 6) so that the upper surface is flush with the crown surface 2a (cutting operation). These forming processes are made to complete the forming operation of the piston 1.

As described above, in the present embodiment, the low thermal conductivity part 5 is provided at the part of the crown surface 2a of the piston 1 to which fuel is directly injected, wherein the low thermal conductivity part 5 is composed of the porous member 6 as a man structure, and the porous member 6 is made of borosilicate glass having a lower thermal conductivity than the aluminum alloy material. This produces an excellent thermal insulation property, and thereby promotes sufficiently atomization of the fuel, to enhance the combustion performance, and enhance the fuel efficiency.

With regard to the thermal conductivity of the low thermal conductivity part 5, as the porosity of the pores 9a of the porous member 6 decreases, the quantity of impregnation of the aluminum alloy material 1a of the piston 1 in the pores 9a decreases so that the thermal conductivity decreases because the total volume ratio of the first powder 8 (glass powder) and the residual sodium chloride powder increases.

After the residual sodium chloride appearing on the surface is dissolved and removed with water or hot water, the surface area becomes larger than the surface area constituted by the first powder 8 and the residual sodium chloride before the removal, because only the glass component of the first powder 8 is left to form irregularities after the removal. As described above, as the thermal conductivity of the low thermal conductivity part 5 decreases, the quantity of accumulated heat in the low thermal conductivity part 5 increases, so that the accumulated heat serves to promote atomization of the fuel, and the increase of the surface area also serves to transmit heat to the fuel, and thereby promote atomization of the fuel.

Moreover, the configuration that the low thermal conductivity part 5 is impregnated through the many pores 9a with the aluminum alloy material 1a that is identical to the piston base material 1', serves to enhance the fusion resistance between the aluminum alloy material 1a and the piston base material 1', and thereby enhance the bond strength therebetween.

As a result, it is possible to simultaneously achieve high thermal insulation and high bond strength between the piston base material 1' and the low thermal conductivity part 5.

In particular, the configuration that the many pores 9a of the porous member 6 are impregnated with the cast alloy 1a of the piston 1, serves to increase the interface strength between the porous member 6 and the cast alloy of the piston 1.

In consideration that there is a possibility that the glass material appearing on the surface of the porous member 6 is chipped to fall, the aluminum alloy of the piston 1 is anodized to cover the surface of the glass material, and thereby suppress the chipping, and obtain a thermal insulating effect of the anodized layer.

Furthermore, the configuration that the cavity surface 23A of the inner top core 23 is machined with high precision as a finished surface of a final product in advance, serves to eliminate the necessity of post-processing such as finishing for the crown surface 2a of the cast piston 1, and allow the piston 1 to be used after the casting, and thereby allow the piston 1 to be produced inexpensively.

In the above description, a case is exemplified in which only the inner top core 23 is formed in porous form (breathable mold), but it is desirable that the core 15 and the mold bush 17 are also formed in porous form in addition to the inner top core 23. This serves to enhance the heat retaining property because the porous form contains gas inside, and retain preferable fluidity of the molten material.

Moreover, the configuration that the inner top core 23 of the vacuum casting mold 10, which is made of the porous material, is set to have a pore size of 4 to 12 µm, serves to prevent part of the molten material from entering the pores by surface tension of the molten material, and prevent galling, even when the product is formed by pouring the molten aluminum alloy without mold wash.

Furthermore, the configuration that the portion of the inner top core 23 where high transfer precision is required is formed to have a wall thickness of 12 mm or less, serves to achieve an accurate transfer by sucking the molten material by effectively venting the gas in the cavity through this portion.

The configuration that the porous material of the inner top core 23 is formed by sintering an iron-based metal powder, serves to enhance the heat resistance when the molding is performed by pouring the molten aluminum alloy into the cavity.

The configuration that the iron-based metal powder is a stainless steel powder, serves to enhance the corrosion resistance, heat resistance and wear resistance.

According to this invention, using of sodium chloride as an interposed substance, leads to a high solubility and a low material cost, and thereby serves to reduce the manufacturing cost.

The invention claimed is:

1. An internal combustion engine piston for an in-cylinder injection spark-ignition internal combustion engine, comprising:
 a crown surface; and
 a low thermal conductivity part provided partly in the crown surface, and disposed at a predetermined portion of the crown surface, wherein the predetermined portion is configured to receive injection of fuel from an injector, and wherein the low thermal conductivity part is lower in thermal conductivity than a base material of the internal combustion engine piston, the base material being an aluminum alloy;

wherein:
the low thermal conductivity part includes a porous member made of a glass material lower in thermal conductivity than the base material, and impregnated with the base material; and a first material is interposed at least partly between the porous member and the base material in the low thermal conductivity part, wherein the first material contains at least one of sodium chloride, potassium chloride, magnesium chloride, calcium chloride, potassium carbonate, sodium carbonate, sodium sulfate, magnesium sulfate, potassium sulfate, sodium nitrate, potassium nitrate, magnesium nitrate, calcium nitrate, and sodium tetraborate.

2. A production process for an internal combustion engine piston including a crown surface including a low thermal conductivity part lower in thermal conductivity at least than a base material of the internal combustion engine piston, the base material being an aluminum alloy, the production process comprising:
an operation of mixing a first powder and a second powder to produce a mixed powder, wherein the first powder is a material lower in thermal conductivity at least than the base material and heat-softenable, and wherein the second powder is water-soluble, and has a higher melting point than the first powder;
an operation of pressure-forming and burning the mixed powder;
an operation of forming a porous member by dissolving the second powder in a liquid after the burning;
an operation of pouring a molten material of the base material into a mold while vacuuming the porous member set in the mold or pressurizing the molten material, thereby impregnating the porous member with the base material; and
an operation of cutting a surface of the porous member to make the low thermal conductivity part of the crown surface of the internal combustion engine piston cooled and thereafter taken out from the mold.

3. The internal combustion engine piston according to claim 1, wherein the porous member has a porosity greater than or equal to 60 vol % and less than 80 vol %.

4. The internal combustion engine piston according to claim 3, wherein the porous member is formed to contain at least borosilicate glass.

5. The internal combustion engine piston according to claim 1, wherein the first material is sodium chloride.

6. The production process according to claim 2, wherein:
the first powder contains borosilicate glass; and
the second powder contains sodium chloride.

7. The production process according to claim 6, wherein the first powder and the second powder are in a weight ratio of about 54-to-46.

8. The production process according to claim 2, wherein the burning of the mixed powder is carried out at a temperature of 650 to 750° C. for a period of 20 to 40 minutes.

9. The production process according to claim 2, wherein the dissolving of the second powder is carried out in hot water at a temperature of 50 to 95° C. for a period of 5 minutes to 3 hours.

10. The production process according to claim 2, wherein the second powder has an average particle size of 850 to 1300 μm.

11. The production process according to claim 2, wherein:
the mold includes a top core to form the crown surface; and
the top core is implemented by a breathable mold having a pore size of 4 to 12 μm.

12. The production process according to claim 11, wherein the top core is formed by sintering an iron-based metal powder.

13. The production process according to claim 12, wherein the iron-based metal powder is a stainless steel powder.

14. The internal combustion engine piston according to claim 1, wherein the low thermal conductivity part has a surface covered by an anodic oxide coating of aluminum alloy.

15. The production process according to claim 2, further comprising an operation of dissolving in the liquid the second powder at the surface of the porous member after the operation of cutting, to thereby make the low thermal conductivity part uneven.

16. The internal combustion engine piston according to claim 4, wherein:
the porous member is a silicate compound;
the base material is an aluminum alloy; and
the first material is sodium chloride interposed at least partly between the silicate compound and the aluminum alloy.

17. The internal combustion engine piston according to claim 16, wherein the porous member has a surface covered by an anodic oxide coating of aluminum alloy.

18. The production process according to claim 2, wherein each of the first powder and the second powder has a melting point higher than 700° C.

* * * * *